United States Patent [19]

Bauman

[11] 4,191,939
[45] Mar. 4, 1980

[54] VEHICLE PARKING SIGNALING DEVICE

[76] Inventor: Claire Bauman, 2860 S. Ocean Blvd., Palm Beach, Fla. 33480

[21] Appl. No.: 943,060

[22] Filed: Sep. 18, 1978

[51] Int. Cl.² ............................................ B60Q 1/00
[52] U.S. Cl. .................................. 340/107; 340/81 R
[58] Field of Search ................... 340/91, 95, 107, 119, 340/81 R

[56] References Cited
U.S. PATENT DOCUMENTS

| 2,866,175 | 12/1958 | Slater | 340/107 |
| 3,800,430 | 4/1974 | Samra | 340/95 |

Primary Examiner—Donald J. Yusko
Attorney, Agent, or Firm—Malin & Haley

[57] ABSTRACT

A safety device for use with a vehicle such as an automobile or the like which provides a driver actuated signal for visually indicating to a following vehicle driver that the leading vehicle is seeking and/or is about to maneuver into a parking area. This provides adequate notice to the driver of the vehicle following so that the following vehicle may be maneuvered safely around the parking vehicle to allowing the parking vehicle to more readily maneuver into a parking space. The device includes an illuminated display which is mounted on the rear of a vehicle, a power source and a switching circuit controllable by the driver to activate the display regardless of whether the vehicle is in forward or backward motion or is stopped. The switching circuitry is connected to the conventional left and right turn signal lever and switch and is activated by fast sequential movement of the turn signal lever (left to right or right to left) causing the parking alert display to blink, bypassing the normal left and right turn signals. The parking alert display will continue to blink or be illuminated until the ignition key is turned off.

2 Claims, 2 Drawing Figures

VEHICLE PARKING SIGNALING DEVICE

BACKGROUND OF THE INVENTION

This invention relates generally to a safety device which is affixed to a conventional vehicle such as an automobile or truck that provides a visual indication whenever necessary to the driver in a following vehicle that indicates that a lead vehicle is seeking a parking space.

A common problem experienced by a driver in today's vehicle traffic is to seek a parallel parking space along a road side on a two or four lane highway. One of the problems encountered is that oftentimes the following vehicle will ride too closely to the rear end of the parking vehicle, making it difficult or impossible for the parking vehicle to back into a parallel parking space. Further, should the parking vehicle engage its directional signal, which is currently the only available means to offer indication of intent to move into a parking spot, the following vehicle may assume that the parking vehicle intends to make a turn as the signal indicates. Should the following vehicle wish to turn in that same direction, it will continue a pace, traveling at close range with the intention of turning promptly after the parking vehicle's assumed turn is effected. The problem is caused by the failure of the following vehicle driver to clearly realize that the vehicle driver in front is actively searching for a parking space or seeking to park in a vacant parking space, or is awaiting another vehicle to pull out to obtain that parking space. This may also result in having several following vehicles stack up in a row making it impossible for the immediate vehicle behind the parking vehicle to back up to allow the parking vehicle sufficient room to maneuver into the parking space.

The present invention overcomes the problems experienced heretofore by providing a safety device that is readily affixed to a conventional automobile, truck or the like which allows the driver of the parking vehicle to prominently indicate to a following vehicle driver that the lead vehicle driver is looking for a parking space and/or is about to park.

BRIEF DESCRIPTION OF THE INVENTION

A driver actuated display device for indicating to a following vehicle that the lead vehicle is intending to park comprising an illuminable display which is mounted on the rear of the vehicle, a DC power source vehicle electrical system for illuminating said display, a circuit means connecting the display to the power source and a switching means mounted near the driver's console accessible by the driver for actuating and illuminating the display. The display contains illuminating lamps and indicia to provide a suitable indication that the vehicle is to be parked, which may include letters or symbols which are distinguishable from the conventional rear vehicle lights.

In one embodiment, the display lamp or lamps would be mounted in a metal or plastic housing of sufficient size to contain translucent or transparent plastic block letters permitting high intensity light to pass through the block letters that can readily be visually perceived by a driver in a following vehicle a sufficient distance behind the vehicle to be parked to allow the following vehicle's driver to promptly react.

The switching circuitry is connected to a DC supply voltage contained in the vehicle to provide DC voltage to the lamps disposed in the display housing. The switching circuitry can be mounted in a housing and connected to the conventional left and right turn signal circuitry. A switch consists of circuit elements which allow the illuminated display to be actuated upon a rapid right-left or left-right sequencing of the turn signal lever within a predetermined time duration. The circuit itself could be contained on a small printed circuit board mounted in the housing and include a JK flip flop integrated circuit and a switching transistor capable of switching a DC supply voltage at a current level required to illuminate the lamp or lamps in the display. A silicon control rectifier (SCR) could be added to the circuit if the switching current exceeds the power rating of the transistor. An RC timing circuit is required to lock the flip flop if the sequence is completed (left to right or right to left direction signal lever actuation) within a short time (five seconds) or to permit lock out if the sequence is incomplete or exceeds the five second or other predetermined time duration.

The device may be added to an existing vehicle by connecting a supply voltage wire to the fuse block of the vehicle. The left and right turn signal connections are made through the cable circuitry which supplies the signals to the left and right tail lights which are located normally in the trunk of a vehicle. An output signal wire would be connected to the lamps in the display housing.

It is an object of this invention to provide a safety signaling device which is attachable to a vehicle to indicate to a following vehicle driver that the lead vehicle is maneuvering for a parking space.

It is another object of this invention to provide a safety device for a vehicle for use when parking, especially in a parallel parking space, that would provide an indication to a following vehicle driver to give the driver sufficient notice to leave enough room for the lead vehicle to safely park and for the following vehicle driver to correct his position to an ongoing movement lane of traffic.

And yet, still another object of this invention is to provide a vehicle parking signaling device which may be economically produced and which is readily attachable to a presently existing vehicle.

In accordance with these and other objects which will be apparent hereinafter, the instant invention will now be described with particular reference to the accompanying drawings.

PREFERRED EMBODIMENT OF THE INVENTION

Figure 1:
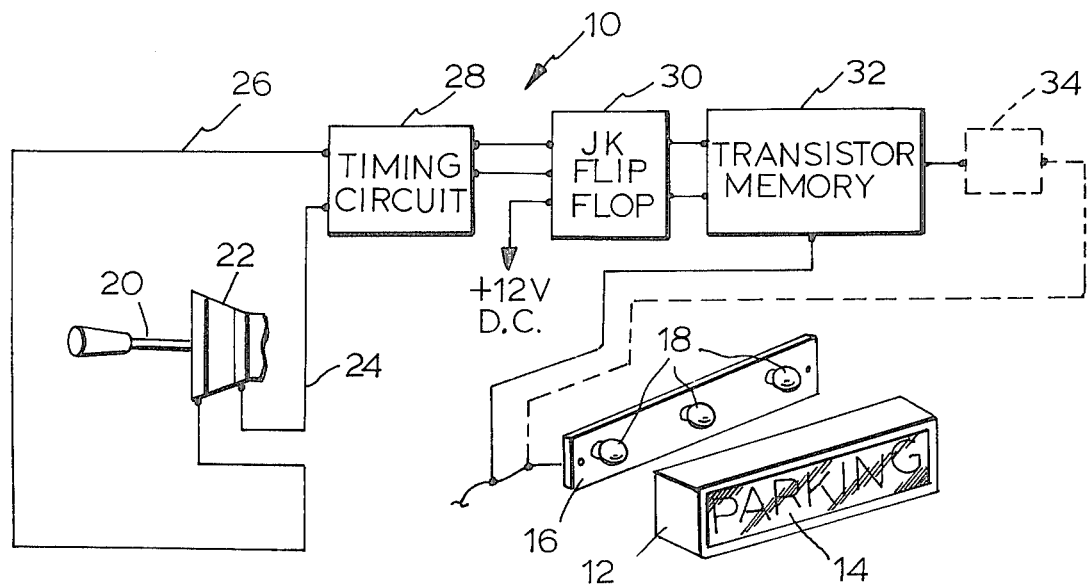
FIG. 1 shows a schematic block diagram of the electrical circuitry which may be utilized in one embodiment of the instant invention.

Referring now to the drawings, and specifically FIG. 1, the instant invention is shown in one embodiment generally at 10 comprised of a display housing 12 having a translucent or transparent face plate 14 with the indicia "parking" displayed therein such that when lightbulbs 18, which are mounted on a panel 16 which is affixed within the housing, illuminate, the word "parking" is distinctively illuminated. The lightbulbs 18 are illuminated by a circuit comprised of a timing circuit such as an RC circuit 28 which is connected to a JK flip flop 30 which is coupled to a transistor switch 32. A simple series circuit is formed between the timing circuit 28, the flip flop 30, the voltage supply which in this case would be a 12 volt DC voltage from the car, the lightbulbs 18 and the socket (not shown) in the display panel 16. The flip flop 30 is locked or actuated by an appropriate signal from the timing circuit 28 which is connected to the left turn signal and right turn signal wires 24 and 26 respectively which are connected to the turn signal switch (not shown) actuated by turn signal lever 20 mounted on a conventional steering column 22. Rapid sequential actuation of the left and right turn signal switches (left to right or right to left) within a predetermined period of time (such as five seconds), will provide two signals in the timing circuit 28 to lock in flip flop 30. With the flip flop 30 locked in, transistor 32 is fired completing the circuit causing the bulbs 18 to illuminate. The circuit may be connected through the ignition switch if desired. Optionally, an SCR 34 may be added in the circuit if the switching current exceeded the power rating of the transistors. The device operates until the ignition switch is shut off, which unlocks the flip flop 30, resetting the entire circuit to the off position.

Figure 2:
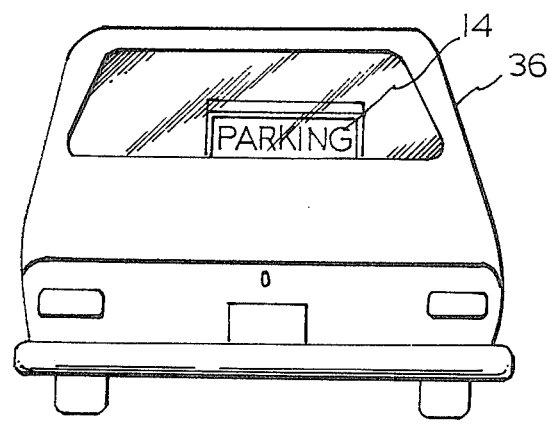
FIG. 2 shows a perspective drawing of the display device as mounted on a vehicle in accordance with the instant invention.

FIG. 2 shows the mounting of the display illuminating plate 14 and the housing 12 on the rear portion of a vehicle to provide adequate visual perception by the driver of a following vehicle. The particular location of the display housing on the rear of the vehicle may be a matter of design choice as long as the following vehicle driver can readily observe the display. Other forms of indicia other than that shown may be utilized for training drivers to associate a particular specific indicia which is illuminated at the rear of the vehicle with the realization that the vehicle is seeking a parking space.

Although a particular embodiment has been shown, other driver actuated switching means may be utilized to employ the device. It should be realized that the device operates regardless of whether the vehicle is traveling forward, is in a neutral position and stopped, or is in the act of backing up. This offers the advantage that during any phase of driving and motion of the vehicle, the driver can actuate the parking illumination display when necessary.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A warning device mounted upon a vehicle having left and right driver actuated turn signals and a turn signal actuating arm to provide adequate notice to a driver of a following vehicle that the lead vehicle is desirous of parking or is about to be parked, comprising:

an illuminable display means observable from the rear of said vehicle containing indicia representative that the vehicle is to be parked connected to said vehicle;

an electrical power supply means connected to said display means;

a means for switching said illuminable display means from an "off" position to an "on" position which is actuated by the driver connected to said turn signal actuating arm and said electrical power supply means;

said illuminable display means having at least one lightbulb and a translucent indicia display disposed adjacent said lightbulb; and said display switching means connected to the turn signal actuating arm of said vehicle and actuated by rapid sequencing of said turn signals within a predetermined period of time between the left to right or right to left turn signal position to illuminate said parking display means.

2. A device as in claim 1, wherein said display switching means includes:

timing circuit means connected to said left turning signal circuit and said right turning signal circuit, and circuit means connected to said timing circuit, said power supply and said lightbulb responsive to the output of said timing circuit for actuating said lightbulb whenever said left and right turn signals are actuated within a predetermined time as determined by said timing circuit.

* * * * *